US006963974B1

(12) United States Patent
Skinner et al.

(10) Patent No.: US 6,963,974 B1
(45) Date of Patent: Nov. 8, 2005

(54) METHOD AND APPARATUS FOR PROVIDING NON-REPUDIATION OF TRANSACTION INFORMATION THAT INCLUDES MARK UP LANGUAGE DATA

(75) Inventors: Eric R. Skinner, Ottawa (CA); Kevin Simzer, Gloucester (CA); Ivo Ruckstuhl, Zurich (CH); Dhanya Thakkar, Kanata (CA)

(73) Assignee: Entrust Limited, Ottawa (CA)

( * ) Notice: Subject to any disclaimer, the term of this patent is extended or adjusted under 35 U.S.C. 154(b) by 796 days.

(21) Appl. No.: 09/753,292

(22) Filed: Dec. 28, 2000

(51) Int. Cl.[7] .............................................. H04L 9/00
(52) U.S. Cl. ..................................... 713/176; 713/168
(58) Field of Search .............................. 713/150, 156, 713/168, 170, 175–176, 189, 200–201, 161, 713/180; 705/64, 75, 50, 67, 405

(56) References Cited

U.S. PATENT DOCUMENTS

| | | | |
|---|---|---|---|
| 4,458,109 A | 7/1984 | Mueller-Schloer | |
| 5,553,145 A | 9/1996 | Micali | |
| 5,557,518 A | 9/1996 | Rosen | |
| 5,703,949 A | 12/1997 | Rosen | |
| 6,035,402 A * | 3/2000 | Vaeth et al. | 713/201 |
| 6,073,242 A | 6/2000 | Hardy et al. | |
| 6,092,202 A * | 7/2000 | Veil et al. | 713/201 |
| 6,105,072 A | 8/2000 | Fischer | |
| 6,145,084 A | 11/2000 | Zuili et al. | |
| 6,253,322 B1 * | 6/2001 | Susaki et al. | 713/170 |
| 6,345,288 B1 * | 2/2002 | Reed et al. | 709/201 |
| 6,363,479 B1 | 3/2002 | Godfrey et al. | |
| 6,535,978 B1 * | 3/2003 | Padgett et al. | 713/156 |

OTHER PUBLICATIONS

Itu-T, F.400/X.400—Message handling system and service overview, Jul. 1996, International Telecommunication Union.
ISPortal, Putting the Internet to Work for Private WANs, 1998, Compatible Systems.
Kent et al., RFC 2402-IP Authentication Header, Nov. 1998, The Internet Society.

* cited by examiner

*Primary Examiner*—Hosuk Song
(74) *Attorney, Agent, or Firm*—Vedder, Price, Kaufman & Kammholz, P.C.

(57) ABSTRACT

An apparatus and method provides non-repudiation of transaction information such as mark up language forms, using a non-proxy cryptographic application, such as an applet, that provides information to and from the Web browser. Once a user fills out a mark up language-based form as provided, for example, through a Web browser and selects a "submit" button, the non-proxy cryptographic application sends the completed form to a server or the receiving unit that provided the incomplete form and waits for the server to present confirmation data such as a confirmation request form. In one embodiment, once a confirmation request form is received, the non-proxy cryptographic application temporarily maintains the confirmation request form, namely a representation of the completed form as provided by the server, in temporary (e.g., volatile) memory, such as RAM. The non-proxy cryptographic application then sends a copy of the temporarily maintained confirmation request form to the Web browser for display to a user. If the user accepts the copy of the confirmation request form, it is signed and sent back to the server where it is compared with a stored copy to insure that no tampering of the accepted form occurred.

20 Claims, 3 Drawing Sheets

METHOD AND APPARATUS FOR PROVIDING NON-REPUDIATION OF TRANSACTION INFORMATION THAT INCLUDES MARK UP LANGUAGE DATA

RELATED CO-PENDING APPLICATION

This application is related to co-pending application entitled "System and Method for Signing Markup Language Data", having as inventors Godfrey et al., Ser. No. 09/120,715, filed on Jul. 22, 1998, and owned by instant assignee.

FIELD OF THE INVENTION

The invention relates generally to systems and methods that employ digital signatures and more particularly to systems and methods that initiate generation of a digital signature, such as digital signatures for forms or other non text-based information.

BACKGROUND OF THE INVENTION

Many of today's communication systems using Internet appliances, cell phones, portable computers and other systems, such as computer networks, telecommunication systems and other systems are increasingly employing digital signature technology to allow units that are communicating within the system to digitally sign data so that a receiver can verify that the data was in fact sent by a sender purporting to be the originator. One well known type of system is a public/private key system that incorporates a digital signature key pair as known in the art. In such systems, a public signature key is known to any participants in the community, and a secret private digital signature key is assigned to each subscriber, such as a software application, a computer terminal, or other entity. Industry standards have developed for electronic mail (e-mail) servers that route e-mails, through a store-and-forward manner, among members of the communication system community. Such store-and-forward based communication typically uses for example, a MIME format, as known in the art. In such systems, a user must typically initiate a digital signature process. As such, when text data is sent by an e-mail server or by an originator, the user must manually request and add a digital signature to the information which may then be communicated to another communication unit for verification.

However, increasingly, transactions requiring interactive, generally real time, bi-directional communication, including text and non-text information need to be facilitated over worldwide networks and intra-networks, such as systems that employ the use of markup language data. For example, a common markup language used on the Internet is the hypertext markup language (HTML) which is a format used to digitally describe just about everything in the document that is not content. This is sometimes referred to as formatting data. With conventional markup language servers, such as WEB servers, a browser program or other interfaces do not generally include digital signature engines for interactive communications using for example, markup language based data. Typically when a system does include a digital signature engine of some sort, each interface manufacturer typically has its own format for an inclusion of a transaction based digital signature. However, there is no standardized methodology for utilizing digital signatures with formatting data. For example a conventional web server typically needs to maintain a set of digital signature request forms for different types of browsers if a single server needs to communicate with multiple different units within a community not containing the same browser. Although systems are known to have form or markup language based digital signature capability, the requirement of maintaining multiple signature request forms for each different type of browser can unnecessarily increase the overhead of a browser or web server. Also, it would be desirable to have a system and method that allowed the facility to incorporate form-based digital signature communication with browsers or interfaces that do not have digital signature engines. As different web server formats are developed, and as communication systems grow with users having different types of browsers or browsers with no digital signature capabilities, it would desirable to allow non-repudiation of information to be independent to the type of browser or interface used by a subscriber or software application.

Some browsers are known which include an integrated digital signature generator for form based data that utilizes signature initiation data embedded in a subset of data to be signed. The digital signature generator is integrated in the sense that the signature generator uses the same address space as the browser. In one such system, a persistent digital signature is generated so that verification of a signor may be performed after a transaction has occurred. However, such systems typically only sign a portion or subset of the data presented to the user. As such, these systems do not generally provide an accurate record of what the user actually agreed upon. Such systems are typically dedicated to a particular type of web server or a particular type of browser. Therefore an increase in cost and processing overhead occurs when a web server must interface with browsers having differing digital signature engines. A digital signature plug in for each different type of browser may typically be required.

Also, as is known in the art, proxies are typically used in communication systems for transferring data, such as markup language data between a web server for example and a plurality of browsers. For example, a web proxy is typically a program on a server that redirects information and may provide such capabilities such as caching of information, and authentication of signatures. The proxies generally serve as an intermediate protocol handle. By way of example, an HTTP proxy looks at every header in a form to determine what packets are directed to which proxy address.

Also, it is conventional to have digital signature engines in each proxy to allow the digital signing of information that is sent during each data unit transfer session for determining whether information was corrupted during the transfer. For example a single transaction may require communication of multiple data units of information. The length of a data unit may be set by way of an industry standard such as in the case of the Internet. However any suitable data unit length may be used. The digital signatures for each data unit are discarded upon completion of a transaction and it can take multiple data units to get one form communicated. The data unit digital signatures are generated by the proxies to ensure that information was not modified during transmission. The digital signatures are stripped off below the application level so there is no digital signature on the form (e.g., HTTP form) when it is used by an application for example. There is no "persistence" of the signature, since they are used for session integrity only. In conventional systems employing digital signatures during data unit communication, the digital signature is applied by a server proxy for example so that a browser proxy may receive the signed data and verify the integrity of the data. These digital signatures are then discarded prior to the data being sent to the application or browser requesting the information. As such, data unit digital signature engines are used to ensure that data unit information can be checked for integrity. However, subsequent authentication of the information for the entire transaction is typically not used.

On line electronic transactions require proof of a transaction after a transaction has occurred. For example, if a legal contract or bank transaction occurred and there is a dispute at a later time, it would be desirable to use the electronic transaction documentation in a court of law or arbitration setting to avoid repudiation of the transaction by one of the parties to the transaction. Accordingly, digital signatures are often used to uniquely associate a user with a particular document. As noted above, mark up language forms are often used on the Internet to allow users to purchase goods and services on line as well as performing banking transactions and other contractual transactions. Conventional Web browsers typically only use digital certificates for encryption purposes and not for providing digital signatures. In addition, Web browsers are known to interface with cryptographic applications to allow digital signature of data entered by a user into a form. However, as noted above, the form format itself is typically not digitally signed thereby allowing a potential hacker to modify the form format, including displayed field names or other information after a transaction has been executed. Typically, mark up language forms include hidden name attributes (hidden field names), associated field names that are displayed to a user and data entry fields to allow a user to enter data associated with the displayed field name. In addition, form formatting information, such as the fonts, colors, type sizes and other form formatting information is also typically included in mark up language forms. However, known Web browsers typically only sign the hidden "name" attribute of an HTML form input field and the user input information after a user has completed a form for a transaction. Conventional Web browsers typically do not sign the form formatting information, namely the text that is actually displayed to the user, but signs the hidden field names. This information has an effect on the semantics of the data, and hence, there may be different meanings associated with what the user signed and what they viewed on their browser.

Other systems are being developed that allow a digital signing process to sign everything that is actually displayed to a user when the user indicates that he or she has accepted the terms of the transaction or has filled out all the requisite form fields to complete a transaction. These applications are Web-browser based and typically require separate form software. It would be desirable to allow the Web browser to have non-repudiation of Web forms and avoid the need for separate forms each time a transaction has to occur. Accordingly, it would be desirable to have browser-rendered forms to be used in transactions.

A typical sequence of communication for a transaction may be as follows. In the context of an Internet transaction, for example, a user may log on to a home page of an on-line seller. The on-line seller's server (receiving unit) transmits an incomplete HTML form to the user's browser. The user then completes the form by entering the requisite information and clicks on a "submit" button to indicate that the user has completed the transaction. A Web server then sends a detailed summary of the transaction data back to the user to get confirmation that the user agrees to the terms of the transaction. For example, the server may then examine the contents of the completed form and add confirmation data, such as a Web server digital signature, date, time or any other information. The confirmed HTML form is then sent back to the user for final confirmation. The user is able to review the details of the transaction, and may then provide final confirmation by selecting a "accept" button presented through the Web browser. A cryptographic application may then digitally sign the accepted confirmation request information which may include both the visible (displayed) and nonvisible (hidden) form information, namely the user input information, the field names on the form, and the form formatting information. The confirmation information is then sent back to the Web server for final processing and the transaction is complete. However, such systems may require both a client and Web server proxy program when the client proxy interfaces with the Web browser. The client proxy acts as a cryptographic application that signs the user entered data, field name and form formatting information. The Web server digitally signs the form formatting data when it requests confirmation from the user. Such a system typically requires software installation both for every client and in the Web server. This can result in expensive deployability problems, particularly where large numbers of clients wish to use the system.

Accordingly, a need exists for a suitable work up language based non-repudiation method and apparatus.

DETAILED DESCRIPTION OF THE PREFERRED EMBODIMENT

Figure 1:
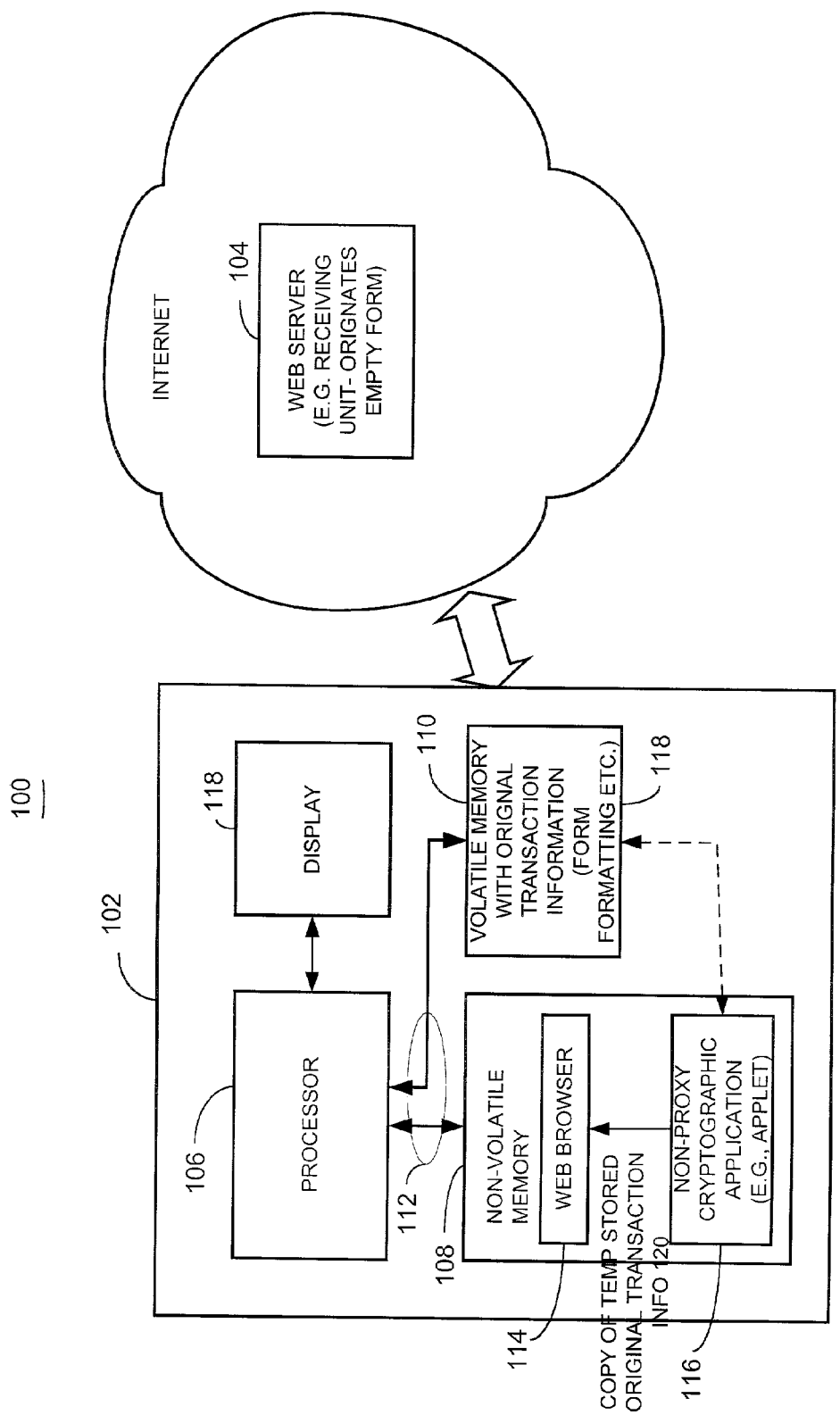
FIG. 1 is a block diagram illustrating one example of an apparatus for providing non-repudiation of transaction information that includes mark up language data in accordance with one embodiment of the invention.

An apparatus and method provides non-repudiation of transaction information such as mark up language forms, using a non-proxy cryptographic application such as a software component that interfaces with the browser using markup or script language, API's, networking etc. that provides information to and from the Web browser and the Web server. This includes, for example, a component such as an applet. Once a user fills out a mark up language-based form as provided, for example, through a Web browser and selects a "submit" button, the non-proxy cryptographic application sends the completed form to a server and the receiving unit that provided the incomplete form and waits for the server to present confirmation data such as a confirmation request form. In one embodiment, once a confirmation request form is received, the non-proxy cryptographic application temporarily maintains the confirmation request form, namely a representation of the completed form as provided by the server, in temporary (e.g., volatile) memory, such as RAM. The non-proxy cryptographic application then sends a copy of the temporarily maintained confirmation request form to the Web browser for display to a user. The Web browser presents (e.g., displays) the confirmation data, to the user. The confirmation form is a detailed summary of the transaction data, and since it is what is being signed it should accurately and completely detail every aspect of the transaction, but it does not need to be a copy of what the user saw (it could be paraphrased, for example). Accordingly, the Web browser presents a copy of the temporarily maintained confirmation request form for display to a user. The user must read the confirmation information to ensure that the paraphrased confirmation is accurate The disclosed apparatus and methods protect a site from user tampering of the transaction. If a user selects to confirm that the user wishes to be bound to the transaction based on the displayed information, the user through the Web browser provides confirmation selection information. The non-proxy cryptographic application then digitally signs the temporarily maintained confirmation request form stored in RAM in response to the confirmation data received from the user. Accordingly, the non-proxy cryptographic application signs the transaction request that it is temporarily holding.

The non-proxy cryptographic application then transmits the signed information back to the receiving unit (e.g., Web server). The receiving unit may then subsequently compare the signature as provided by the non-proxy cryptographic application and compare the signed confirmation request form with a stored copy of the confirmation request form as it existed prior to receiving the digital signature from the non-proxy cryptographic application. If the transaction information is the same, the server is assured that no tampering has occurred during the communication of the information and then may subsequently digitally sign the transaction to avoid repudiation by any party at a later date.

As used herein, the non-proxy cryptographic application cannot interface with a plurality of applications like a proxy application. For example, in one embodiment, the non-proxy cryptographic application is a JAVA applet running in a JAVA sandbox, such as within a contained process space, as known in the art.

One of the many advantages of the disclosed invention is that it can catch potential tampering of a form that has already been submitted by a user The site sends a confirmation request form to the Java applet. The Java applet sends this confirmation request form to the browser, but the confirmation request form cannot be tampered with, since the applet holds a copy (and the server can also hold a copy). The user signs the confirmation request form which includes all aspects of the visual display (the formatting, the visible data, etc.) which helps with non-repudiation.

FIG. 1 is a block diagram showing a communication system 100 having a first unit 102, such as an Internet appliance, software application, such as a Web browser, or any other suitable entity, and a second unit 104, such as a Web server which serves as a mark up language form source for a transaction. Such a system may be used, for example, to transact business or other activities over a worldwide network or intra network. The first unit 102 includes a processing unit 106, such as a microprocessor, DSP, or any other suitable processing unit, non-volatile memory 108 and temporary (e.g., volatile) memory 110. The non-volatile memory 108 may be any suitable random access memory (RAM) in any suitable form or any other suitable memory as desired. The non-volatile memory is operatively coupled to the processing unit 106 through one or more suitable busses indicated generally as 112. The non-volatile memory 108 includes a Web browser application 114 and a non-proxy cryptographic application 116. The first unit 102 also includes a suitable display device 118 that may be used to provide a graphic user interface as well as presenting the mark up language forms for viewing by a user as known in the art.

The non-proxy cryptographic application 116 in one embodiment, is a JAVA applet operating in a JAVA sandbox so that the applications it can communicate with are controlled, and preferably includes the Web browser 114. The non-proxy cryptographic application 116 includes a public key infrastructure-based cryptographic engine, as known in the art, that provides, for example, public key-based encryption, decryption and digital signature operations as known in the art. In addition, the non-proxy cryptographic application temporarily maintains the confirmation request form indicated generally at 118 that was received from the Web server 104. The Web server 104 requests confirmation of a submission of all requisite information for a transaction. A copy of the temporarily maintained confirmation request form 120 is provided to the browser for display to the user on display 118 so that the user visually sees exactly what the user saw when the user initially provided all the information necessary for the transaction. If accepted, only the temporarily stored confirmation request form 118 is digitally signed by the non-proxy cryptographic application to insure that a rogue application cannot sign or otherwise tamper with the accepted information for the transaction.

Figure 2:
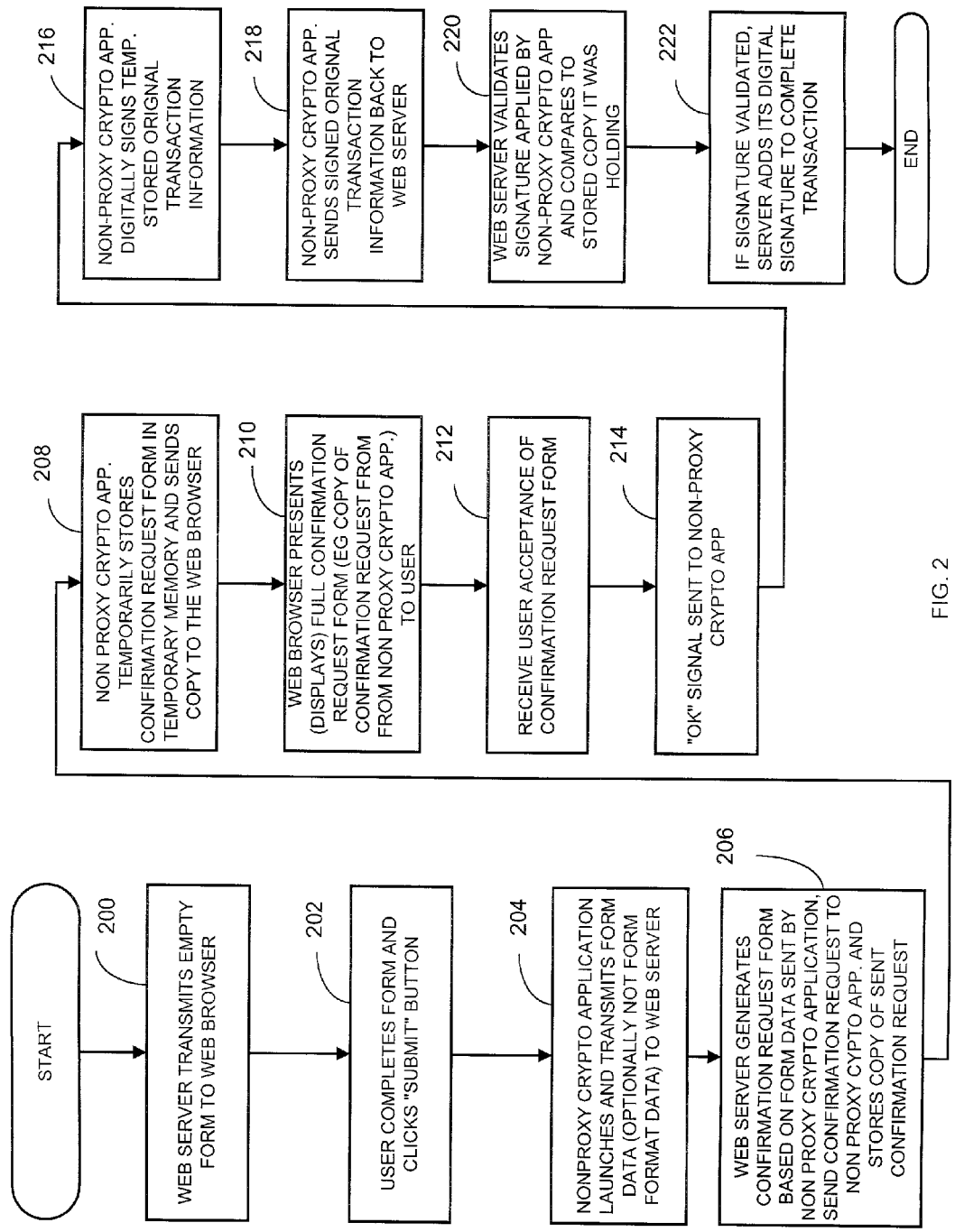
FIG. 2 is a flow chart illustrating one example of the operation of the system shown in FIG. 1.
Figure 3:
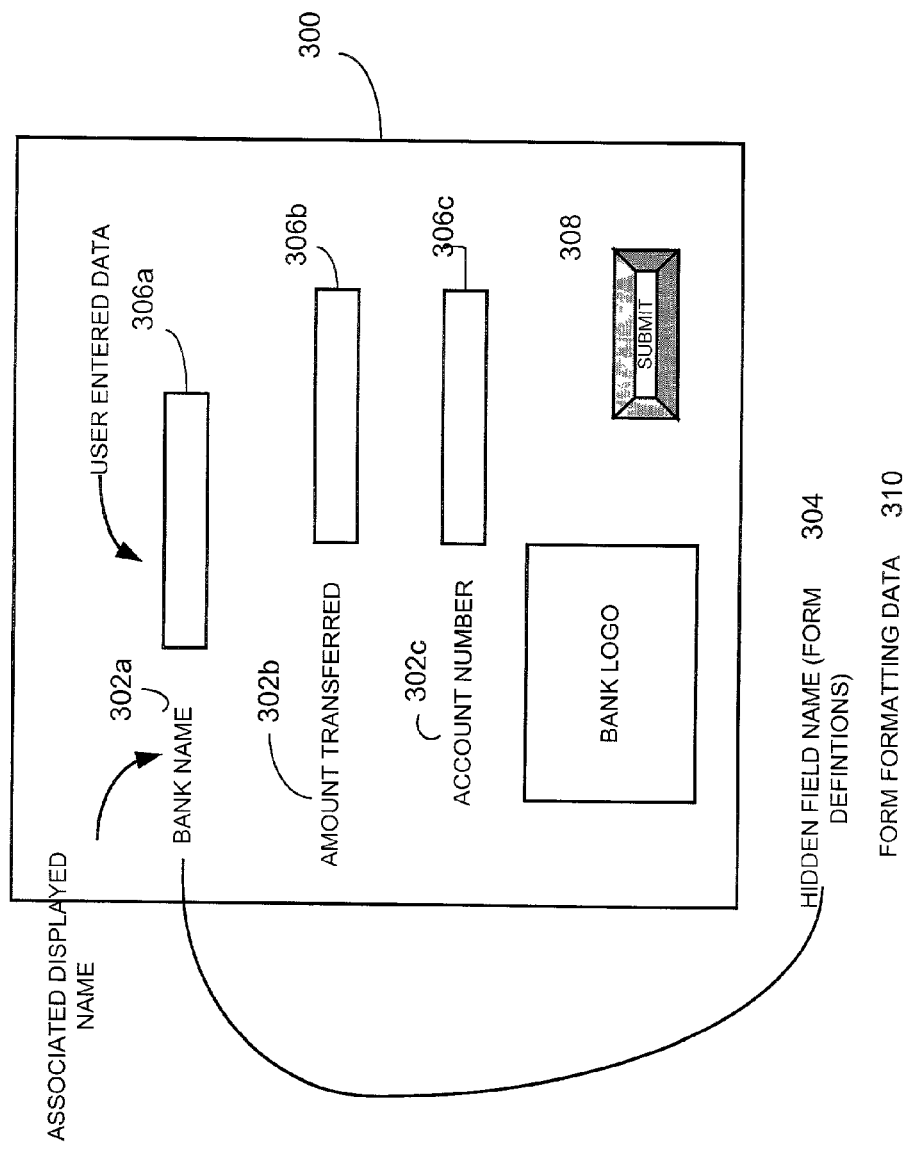
FIG. 3 is a diagrammatic illustration of an HTML form and associated information.

Referring to FIGS. 1–3, the operation of the apparatus 102 and method for providing non-repudiation of mark up language forms will be described. As shown in FIG. 2, in block 200, the Web server 104 transmits an incomplete (e.g., empty-requires user population) mark up language form to the browser 114 in response to a user logging on to a home page or other service of the Web server 104. Accordingly, the Web browser 114 receives an incomplete mark up language form 300 (FIG. 3) which includes at least one field name 302a and form formatting information 310 e.g. font size, font colors, background colors, and tabular layout instructions for use in completing an electronic transaction with a receiving unit, such as Web server 104. The Web browser 114 presents the incomplete mark up language form 300 for completion and later submission to the receiving unit.

For purposes of illustration, and not limitation, a banking transaction will be used as one example of a transaction. In this example, a client unit, such as a cellular phone, Internet appliance, laptop computer, or any other suitable entity that incorporates the first unit 102, logs onto a bank's home page to transfer funds from one account to another or to pay funds for a bill. Accordingly, the Web server 104 may submit a mark up language form to the client unit Web browser 114 and when displayed may appear as mark up language form 300 (FIG. 3).

The mark up language form 300 that is displayed on display 118 may include, for example, displayed names 302a–302c which may have corresponding different (or same) hidden field names indicated as 304. In addition, boxes 306a–306c may be used to show the user where the user should enter data to be associated with the displayed name information 302a–302c. In this example, a user may be required to enter a bank name as well as the amount of money to be transferred as well as the account number of the account form which money is to be transferred. Although not shown, other forms may also be required to complete the transaction. However, for purposes of simplicity, only one form will be used. In addition, a "submit" button 308 may be used so that the user may submit the form to the Web server or other receiving unit when it is completed. Accordingly, as shown in block 202 (FIG. 2), a user may fill in the boxes 306a–306c with the requisite information and click the submit button 308 to indicate that the user has provided the necessary information for a complete transaction.

As shown in block 204, the non-proxy cryptographic application, in response to the submit button being activated, which serves as a completed form submission request, launches and sends the completed form to the server, except for the form layout or form formatting information 310. This can reduce communication bandwidth. Accordingly, the non-proxy cryptographic application sends at least user entered data 306a–306c and the associated field name information 304 as confirmation request form for the receiving unit. However, it will be recognized that all of the form information, including form formatting information 310 as well as displayed name data 302a–302c, and corresponding hidden field names 304 may also be sent back to the receiving unit, if desired.

As shown in block 206, the Web server 104 generates a transaction confirmation request based on the received completed form information (e.g., answers to questions presented in an HTML page). The completed form information is used to prepare the confirmation request form. The Web server 104 creates the confirmation request form to include user entered data 306a–306c or a paraphrased portion of information form the completed form. The Web server 104 keeps a copy of the confirmation request form including its formatting information for use in a later comparison.

As shown in block 208, the method includes temporarily maintaining, under control of the non-proxy cryptographic application, the received confirmation request form sent as or in the transaction confirmation request, in volatile memory 110 (indicated as information 118) associated with the first unit 102. The non-proxy cryptographic application also sends a copy of the confirmation request form 120, including all of its formatting data, received from Web server 104 to the Web browser 114. This is the copy that later gets signed and transmitted back to the Web server.

As shown in block 210, the method includes presenting, by the Web browser, the copy of the temporarily maintained confirmation request form 120 for display to a user so that the Web browser displays the full confirmation request form as originally sent by the Web server. The browser as part of this step also provides a GUI button that the user can activate to again "accept" (i.e. confirm) the terms of the transaction. If the user activates the GUI button, the non-proxy cryptographic application is notified as shown in block 214. As shown in block 216, the non-proxy cryptographic application digitally signs the temporarily maintained confirmation request form 118. This signed information is then transmitted back to the Web server 104 as shown in block 218. Accordingly, the non-proxy cryptographic application sends the signed confirmation request form to the receiving unit for signature verification. As shown in block 220, the Web server performs conventional signature validation on the digital signature applied by the non-proxy cryptographic application. If digital signature verification is successful, the receiving unit compares the stored copy (as mentioned in block 206) as it existed prior to receiving the digital signature, with the received digitally signed confirmation request form as sent by the non-proxy cryptographic application. If the copy stored by the Web server matches the version sent by the non-proxy cryptographic application, the Web server digitally signs the complete form, including form formatting information as shown in block 222.

The non-proxy cryptographic application and Web server operations may be implemented in software, hardware or any suitable combination thereof. If implemented as software, a storage medium, such as a CD ROM, distributed hard drives, databases, any suitable optical or magnetic storage device containing memory may have executable instructions that when read by one or more processing units, causes the one or more processing units to perform one or more operations described herein. For example, a storage medium may contain executable instructions that when read by one or more processing units, causes the one or more processing units to: receive confirmation request form from a server for digital signing by a digital signing process; temporarily maintain the confirmation request form in volatile memory associated with a client unit; present a copy of the temporarily maintained confirmation request form for display to a user to prevent tampering; and digitally sign the temporarily maintained confirmation request form in response to confirmation data received in response to displaying the copy of the temporarily maintained original transaction data.

The confirmation request form is preferably a paraphrased version of the original request, because the site may choose to confirm the transaction using a different layout from the original form, or because it may choose to add additional information to the confirmation (e.g. it may provide an estimated commission fee based on the information provided on the original transaction form. Unlike conventional systems, the paraphrased confirmation data (i.e., the confirmation request form) can be very expressive and does contain formatting instructions and relies on the Web browser's user interface, thus eliminating the need for installation of extra software, and enabling the use of more expressive confirmation screens. In addition, no client and server proxies are necessary. Moreover, the non-proxy cryptographic application signs both the form layout and form content of a transaction confirmation, not merely the hidden name/value data of an original form. In addition, additional confidence is provided through the Web server check that the expected data that was signed, matches the copy that it had stored. With the disclosed apparatus and methods, a user sees exactly what they are signing after they have completed the form that was sent to the Web browser. Since the applet effectively holds a copy of the confirmation request from the server and sends a copy to the browser to display, a rogue application cannot readily tamper with the confirmation request information. Other advantages will be apparent to one of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing non-repudiation of transaction information that includes mark up language data, comprising:

(a) receiving a confirmation request form from a server for digital signing by a digital signing process;
   (b) temporarily maintaining the confirmation request form in volatile memory associated with a client unit;
   (c) presenting a copy of the temporarily maintained confirmation request form for display to a user; and
   (d) digitally signing the temporarily maintained confirmation request form in response to confirmation data received in response to displaying the copy of the temporarily maintained original transaction data.

2. The method of claim 1 wherein the confirmation request form includes at least one mark up language form that includes user entered data, at least one field name and form formatting information, all of which are presented for display to the user for acceptance and for receiving a digital signature.

3. The method of claim 1 including the step of:
(e) sending the signed confirmation request form to a server for signature verification wherein the server compares a stored copy of the confirmation request form as it existed prior to receiving the digital signature, with the received digitally signed confirmation request form.

4. The method of claim 1 wherein the received confirmation request form is sent by a server that also provides incomplete mark up language form data from which the received confirmation request form was based.

5. The method of claim 1 wherein the step of receiving the confirmation request form includes receiving a transaction confirmation request from a server.

6. The method of claim 1 wherein steps (a) and (b) are performed under control of a non-proxy cryptographic software application.

7. The method of claim 6 wherein step (c) is performed under control of a web browser.

8. A method for providing non-repudiation of transaction information that includes mark up language data, comprising:
(a) receiving, by a web browser associated with a client unit, an incomplete mark up language form, including at least one field name and form formatting information, for use in completing an electronic transaction with a receiving unit;
(b) presenting, by the web browser, the incomplete mark up language form for completion and submission to the receiving unit;
(c) launching, in response to a completed form submission request, a non-proxy cryptographic application and sending through the non-proxy cryptographic application, at least user entered data and an associated field name for the receiving unit;
(d) receiving back from the receiving unit, a transaction confirmation request including a confirmation request form that includes the at least user entered data, the associated field name and the form formatting information, for digital signing by the non-proxy cryptographic application;
(e) temporarily maintaining, under control of the non-proxy cryptographic application, the confirmation request form in volatile memory associated with the client unit;
(f) presenting a copy of the temporarily maintained confirmation request form, by the web browser, for display to a user; and
(g) digitally signing, by the non-proxy cryptographic application, the temporarily maintained confirmation request form in response to confirmation data entered by the user in response to displaying the copy of the temporarily maintained original transaction data.

9. The method of claim 8 including the step of:
(h) sending the signed confirmation request form to the receiving unit for signature verification wherein the receiving unit compares a stored copy of the confirmation request form as it existed prior to receiving the digital signature, with received digitally signed confirmation request form.

10. The method of claim 9 wherein the non-proxy cryptographic application is an applet.

11. The method of claim 9 including the step of digitally signing, by the receiving unit, the received digitally signed confirmation request form if the comparison indicates that it matches the stored copy of the confirmation request form.

12. An apparatus for providing non-repudiation of transaction information that includes mark up language data, comprising:
at least one processing unit;
volatile memory, operatively coupled to the processing unit,
non-volatile memory, operatively coupled to the processing unit, containing a web browser and a non-proxy cryptographic application wherein the non-proxy cryptographic application receives confirmation request form from a server for digital signing by the non-proxy cryptographic application, temporarily maintains the confirmation request form in the volatile memory, and wherein the web browser presents a copy of the temporarily maintained confirmation request form for display to a user; and wherein the non-proxy cryptographic application digitally signs the temporarily maintained confirmation request form in response to confirmation data received in response to displaying the copy of the temporarily maintained original transaction data.

13. The apparatus of claim 12 wherein the confirmation request form includes at least one mark up language form that includes user entered data, at least one field name and form formatting information, all of which are presented for display to the user, by the web browser for acceptance and to the non-proxy cryptographic application to receive a digital signature.

14. The apparatus of claim 12 wherein the non-proxy cryptographic application sends the signed confirmation request form to the server for signature verification.

15. The apparatus of claim 12 wherein the received confirmation request form is sent by a server that also provides the non-proxy cryptographic application with initial unpopulated transaction mark up language form data from which the received confirmation request form was based.

16. The apparatus of claim 12 wherein the non-proxy cryptographic application receives a transaction confirmation request from a server.

17. A storage medium comprising:
memory containing executable instructions that when read by one or more processing units, causes the one or more processing units to:
receive confirmation request form from a server for digital signing by a digital signing process;
temporarily maintain the confirmation request form in volatile memory associated with a client unit;
present a copy of the temporarily maintained confirmation request form for display to a user; and
digitally sign the temporarily maintained confirmation request form in response to confirmation data received in response to displaying the copy of the temporarily maintained original transaction data.

18. The storage medium of claim 17 wherein the confirmation request form includes at least one mark up language form that includes user entered data, at least one field name and form formatting information, all of which are presented for display to the user for acceptance and for receiving a digital signature.

19. The storage medium of claim 17 wherein the memory includes executable instructions that when executed by the one or more processing units causes the one or more processing units to send the signed confirmation request form to a server for signature verification.

20. The storage medium of claim 17 wherein the step of receiving confirmation request form includes receiving a transaction confirmation request from a server.

* * * * *